Figure 1:
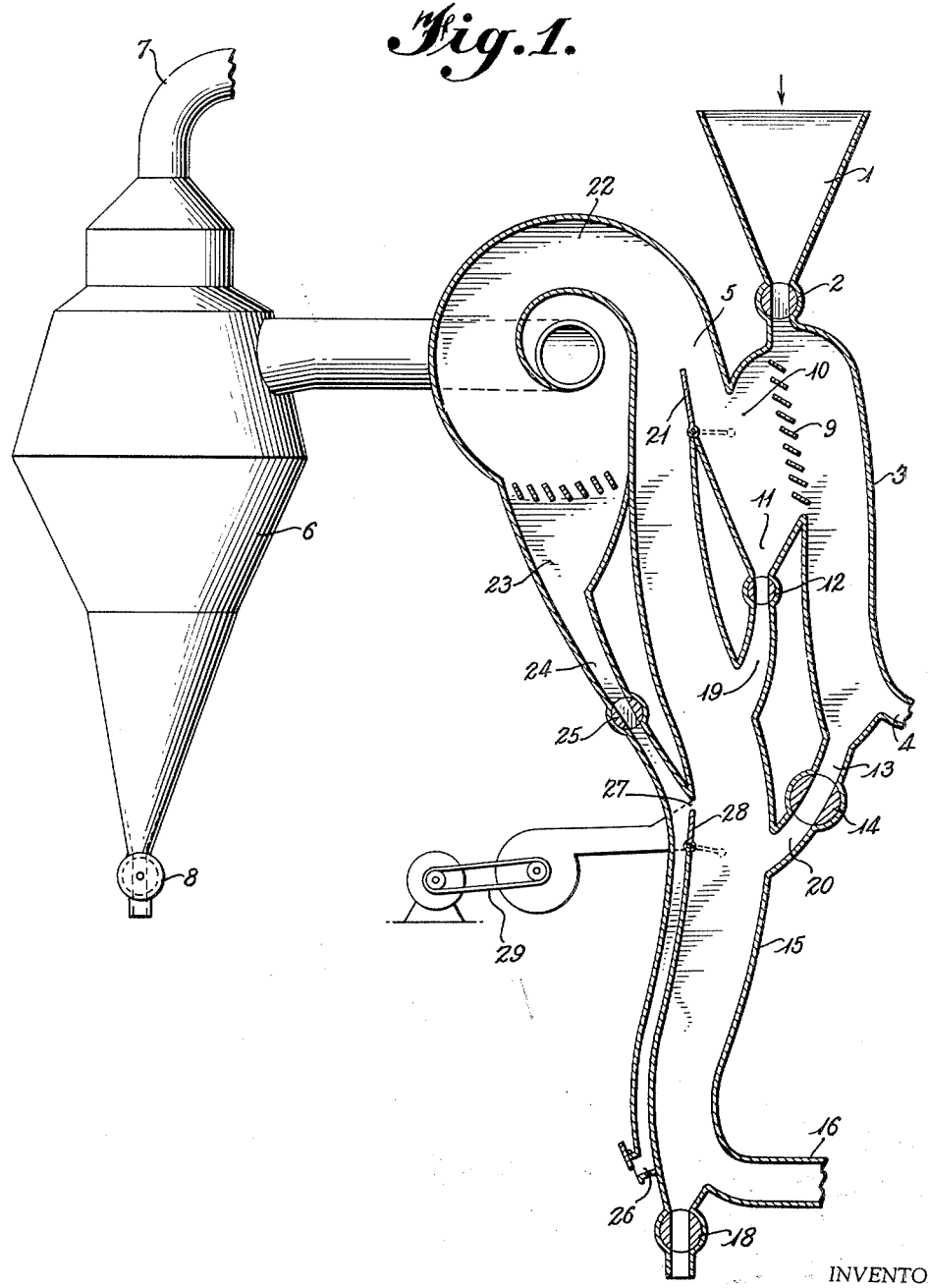

March 29, 1955 E. HARVENGT 2,705,074
DRY DUST FREEING OF COALS AND SIMILAR MATERIALS
Filed Feb. 5, 1951 5 Sheets-Sheet 1

INVENTOR
*Edmond Harvengt*
BY L. Donald Myers
ATTORNEY

March 29, 1955  E. HARVENGT  2,705,074
DRY DUST FREEING OF COALS AND SIMILAR MATERIALS
Filed Feb. 5, 1951  5 Sheets-Sheet 4

INVENTOR
Edmond Harvengt
BY
ATTORNEY

INVENTOR
Edmond Harvengt

United States Patent Office 2,705,074
Patented Mar. 29, 1955

2,705,074

DRY DUST FREEING OF COALS AND SIMILAR MATERIALS

Edmond Harvengt, Moustier-sur-Sambre, Belgium, assignor to Link-Belt Company, Chicago, Ill., a corporation of Illinois Application February 5, 1951, Serial No. 209,363

23 Claims. (Cl. 209—139)

The invention concerns the dry, pneumatic dedusting of coals, and similar materials, and has for its primary object improvements in processes and apparatus for rendering coals, and similar materials, dust-free by removing therefrom the fine and very fine particles, contained in the starting mixture, by means of currents of gaseous fluid.

It is well-known at this time to effect the separation of materials of different densities, or particle sizes, by causing the starting mixture to move in counter-current relationship with either an open or a closed circuit stream of gaseous fluid, such as cold or warm air, confined in a vertical or steeply inclined pipe or conduit, to cause the fluid stream to carry away the suspensible particles to a cyclone for final separation from the fluid. In such a process, however, to effect the separation of the very fine particles from the fine particles, it generally is necessary to use an excessive amount of gaseous fluid with the result that important quantities of the fine particles are delivered to the cyclone separator and, therefore, are not recoverable as a separate product. Attempts have been made to separate the fine particles from the very fine particles while the mixture of the same is moving along its final path to the cyclone but very limited beneficial results have been obtained.

Another process that has been employed for dedusting coals consists of presenting the materials in opened or scattered form to the action of several gaseous fluid currents passing substantially at right angles through the materials, so that the very fine particles may be carried toward the cyclone separator.

A further object of the invention is to ensure effective dedusting of coals, and similar materials, with a limited consumption of power for producing the fluid current or currents and with simple apparatus, while avoiding excessive carrying of the usable fine particles toward the separating cyclone.

To this end, the invention comprises the dry dedusting of coals, and similar materials, with the aid of gaseous fluid currents, by the preliminary removal of the fine and most of the very fine particles from the desired coarse particles, hereinafter called grains, and the subjecting of the separated grains to a secondary, two-stage refining operation, performed in complementary gaseous fluid currents. The fine and very fine particles that are obtained by these preliminary and secondary operations, also, are subjected to further treatment by being introduced, preferably in controlled quantities, into the current employed for effecting the final one of the said two stages of refining operation of the grains.

According to another object of the invention, the preliminary removal of fine and very fine particles from the grains may be accomplished in part by subjecting the starting mixture, directly after its delivery to the apparatus, to repeated impact blows produced by cascading the material over a series of stepped blades, or by passing the material over a vibrating screen, while a flowing current of gaseous fluid is passed through the material.

From the above, it will be appreciated that the fluid current which flows upwardly through the descending grains, during the first one of the two stages of secondary treatment, will be able to effectively free the grains of any very fine particles that may still adhere thereto without being overloaded with such very fine particles, while during the second one of said two stages the rising fluid current will not be required to carry an undue amount of the fine particles.

Figure 2:
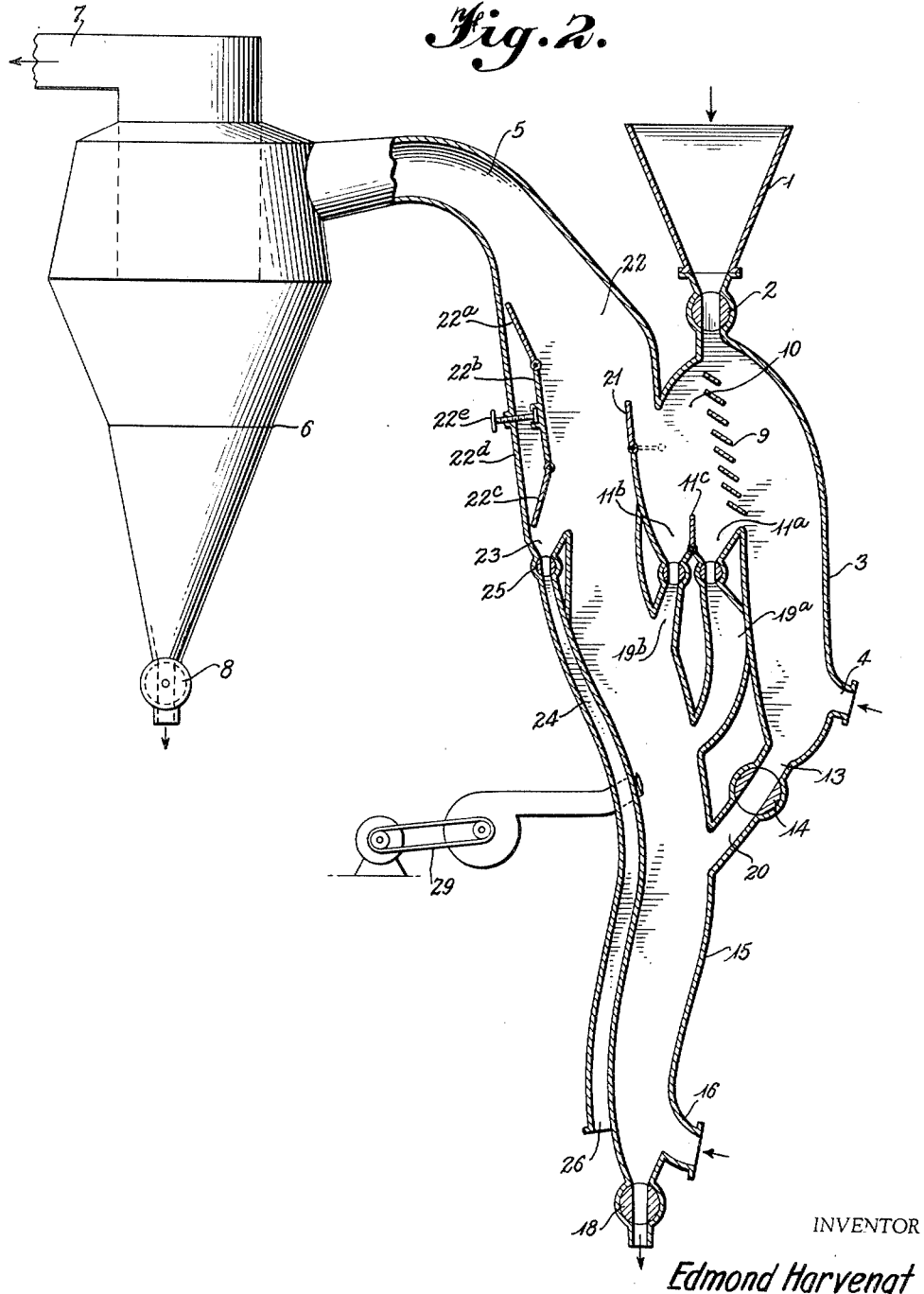
Figure 3:
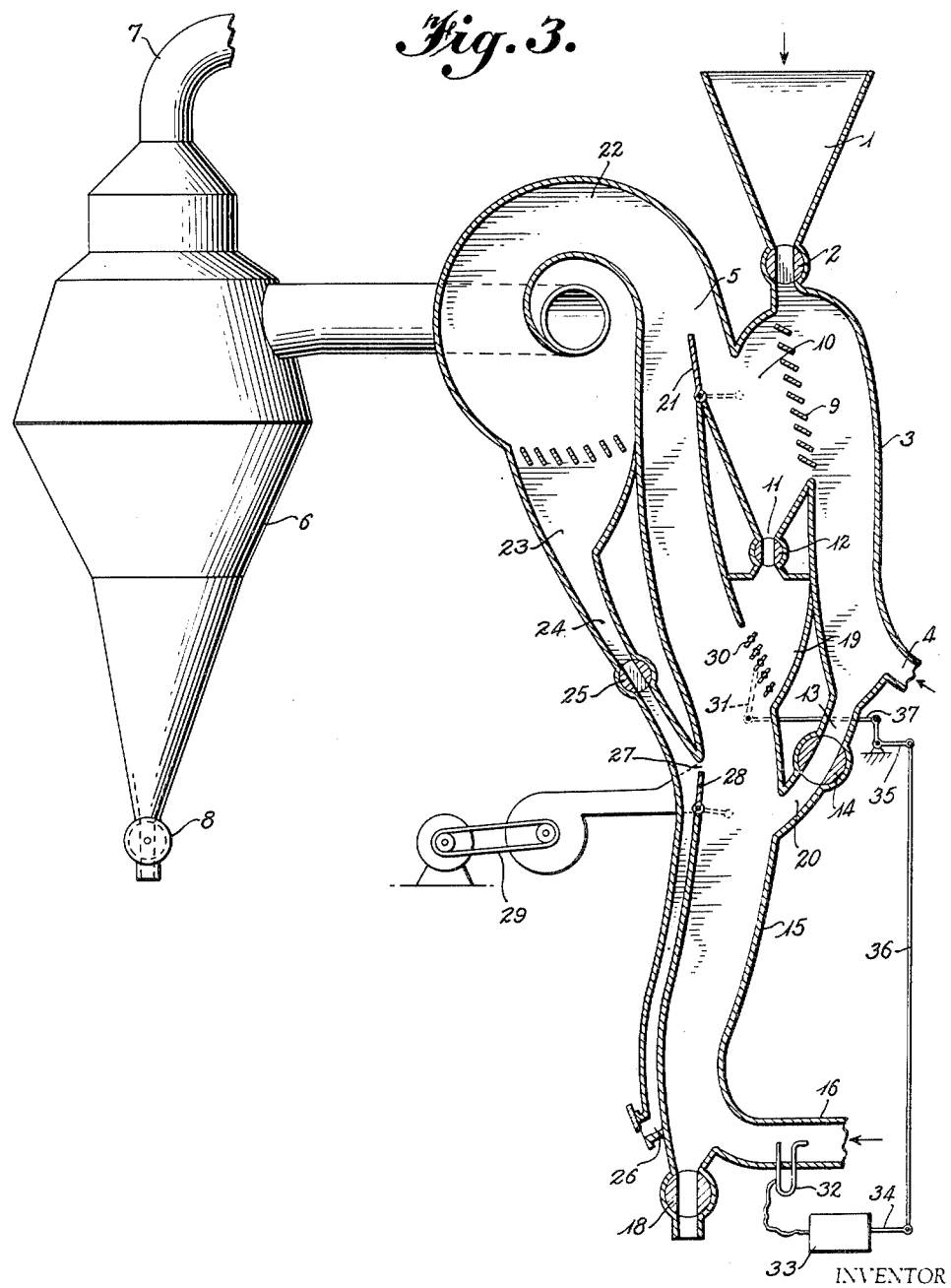
Figure 4:
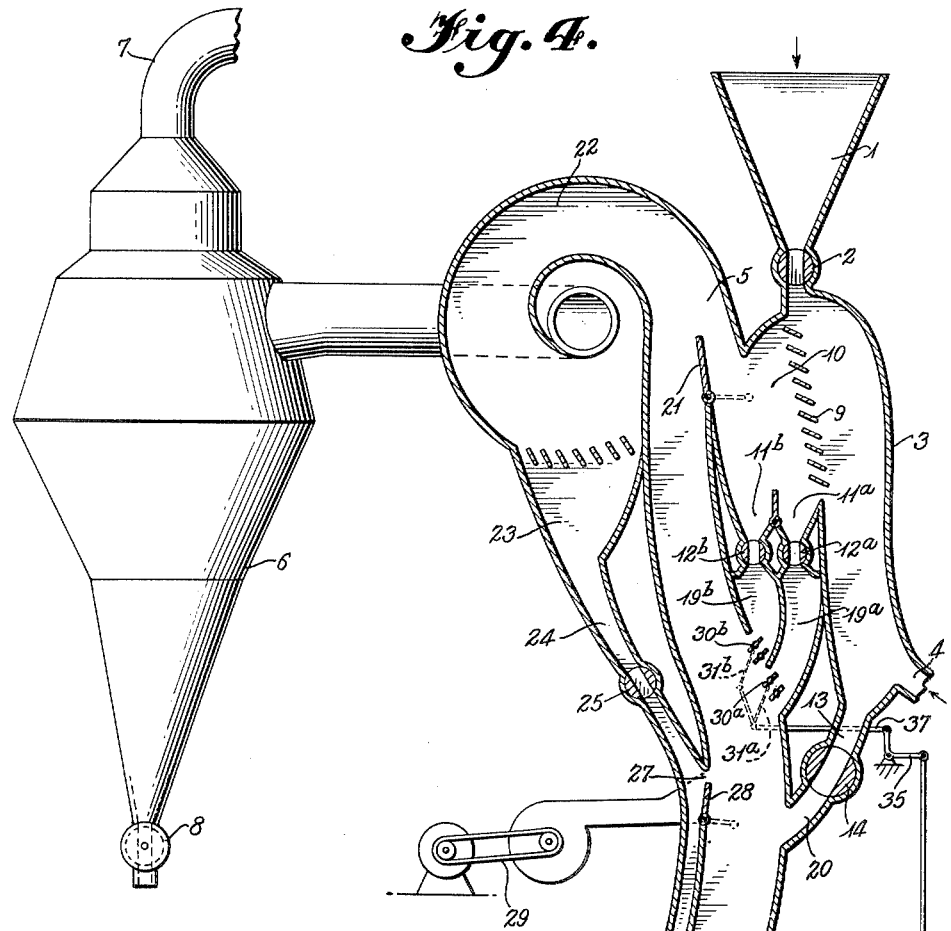
Figure 5:
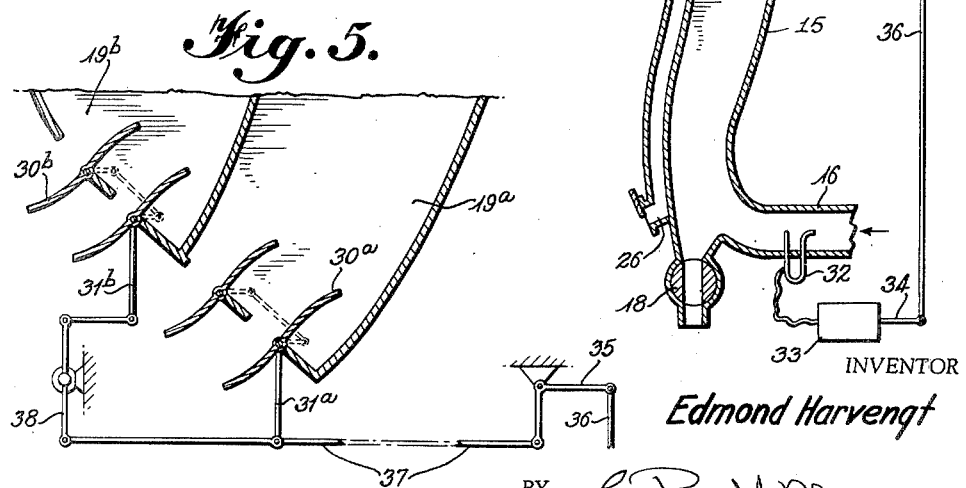
Figure 6:
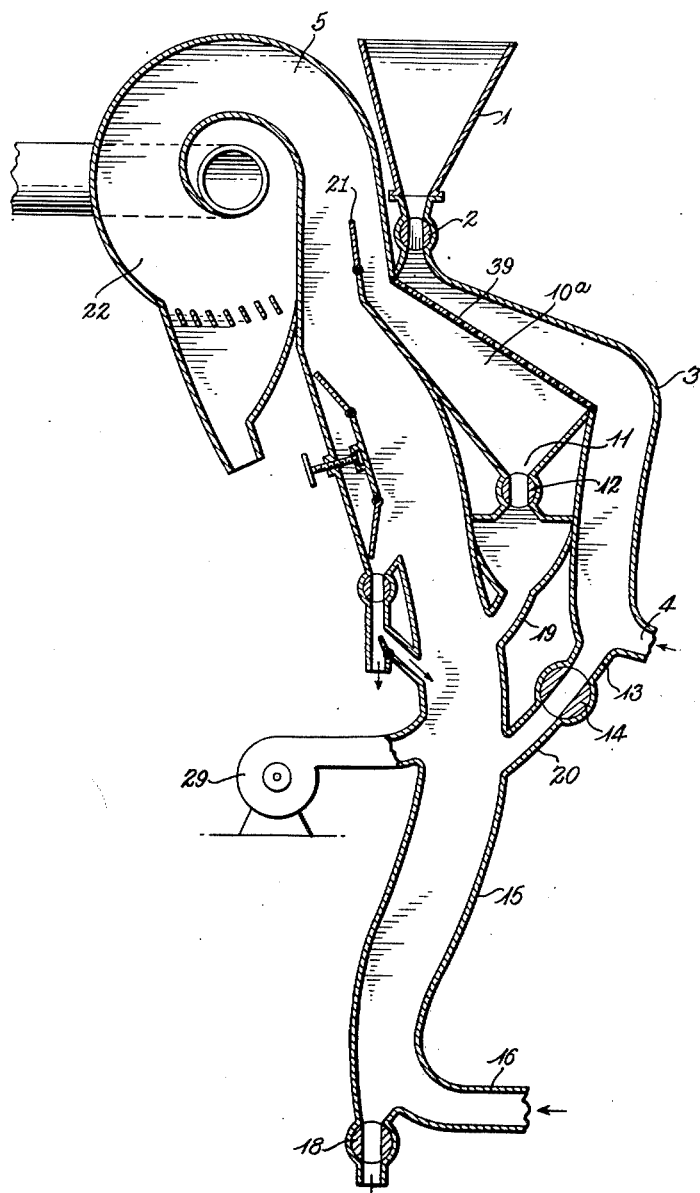

Other objects of the invention will appear from the following more detailed description of certain preferred methods of carrying the invention into practice, together with certain arrangements of apparatus, given by way of examples, and illustrated by the accompanying drawings, in which:

Figure 1 is a partly sectional and partly elevational view of one construction of apparatus for carrying out the method of the invention, Figures 2, 3 and 4 are views similar to Fig. 1 and illustrate three modifications of the invention, Figure 5 is an enlarged view of a part of the apparatus illustrated in Fig. 4, and Figure 6 is a view similar to Fig. 1 and illustrates a further modification of the invention.

Referring to the drawings, and first particularly to the apparatus of Fig. 1, the reference character 1 designates a feeding hopper for the starting mixture of materials to be treated. This hopper is provided at its bottom with an adjustable valve member 2 which discharges the materials to be treated into a substantially vertically extending conduit 3 that is provided toward its lower end with an opening 4 which enables the introduction to the conduit of a gaseous fluid, such as cold or heated air, according to the moisture content of the materials to be treated.

In its upper portion, the conduit 3 communicates with a conduit 5 leading to a separating cyclone 6, of any suitable type, which is connected through the pipe 7 with a suction fan, not shown, while the lower end of the cyclone is provided with a discharge device 8.

A part of the wall of the conduit 3 which faces the conduit 5 is cut away and the opening thereby provided has suitably mounted therein a series of stepped and downwardly inclined blades 9, the spacing and slope of which may be adjustable. These blades are arranged in the path of the starting materials that are discharged from the hopper 1, and they function to open up or spread out such materials as they cascade downwardly over the blades. Between the blades 9 and the inlet to the conduit 5, there is formed an expansion chamber 10, the lower portion of which is provided with a hopper 11 having a valve device 12 at its bottom for effecting controlled discharge of the particles collected in the hopper.

The conduit 3 terminates at its lower portion in an outlet passage 13, that is equipped with an adjustable valve device 14, and which opens at an intermediate level relative to the height of a second substantially vertically extending conduit 15. This latter conduit has an inlet 16 connected to its lower end portion and functioning to deliver gaseous fluid, such as air, which may be cold or heated, to the conduit in accordance with the moisture content of the starting mixture of materials to be treated. A discharge opening, having an adjustable valve device 18, is provided at the lower end of the conduit 15. At its upper end, this conduit communicates with the conduit 5 that leads to the cyclone 6.

A passage 19 extends from the adjustable valve device 12, which regulates the discharge of particles from the hopper 11, to an intermediate portion of the conduit 15. This point of connection with the conduit 15 is at a higher level than the point at which the passage 20 connects to the conduit 15. This passage 20 is connected at its upper end to the adjustable valve device 14 which controls the discharge of material from the lower end of the conduit 3.

Preferably, at the upper end of the conduit 15, where it connects with the conduit 5 and the chamber 10, there is arranged a manually or mechanically operable flap valve 21 which enables the action of the suction fan, connected to the conduit 7 of the cyclone 6, to be differentially adjusted relative to both the conduit 15 and the chamber 10 with its conduit 3.

An expansion chamber 22, conveniently of spiral shape, is inserted in the conduit 5 and is designed for recovering the usable particles which may be carried by the fluid currents leaving the chamber 10 and the conduit 15. The lower portion of the expansion chamber 22 is provided with a hopper 23 which extends downwardly to a discharge conduit 24 provided with an adjustable valve device 25. This valve device controls the flow of particles through the conduit 24 to the lower discharge opening that is controlled by an adjustable valve 26.

If desired, a communicating opening 27 may be provided between the conduit 24 and an intermediate portion of the conduit 15 which may be at substantially the level of the passage 20 that leads from the lower end of the conduit 3. The discharge opening 27, preferably, is provided with an adjustable flap valve 28.

Finally, an auxiliary fan and motor assembly 29 may be provided for connection with the conduit 15 to supply this conduit with additional fluid when it is needed to take care of the fine and very fine particles that are delivered thereto from the hopper 11.

The apparatus, as described, operates in the following manner:

The starting mixture of materials which is to be dedusted, and which is fed to the hopper 1, is discharged into the conduit 3 under the control of the valve 2. During the initial fall of the materials, the particles are spread out, or spaced, at least in part, as a result of their cascading downwardly over the stepped blades 9. In this portion of the conduit 3, the opened-up or separated particles of the starting mixture are subjected to the action of a fluid current which flows upwardly through the conduit and is delivered thereto through its lower open end 4, with the result that the fine particles and a substantial portion of the very fine particles, are separated out and are carried to the chamber 10 through the interspaces between the blades 9.

The grains of the starting mixture, together with the remaining very fine particles, continue their downward movement through the conduit 3 in counter-current relationship to the fluid that is flowing upwardly through the conduit. This upwardly flowing fluid current removes from the said grains most of the very fine particles that still adhere to the grains, and these very fine particles are carried into the chamber 10 along with the initially separated fine and very fine particles. The grains, with any remaining small sized particles, are introduced through the passages 13 and 20, under the control of the valve 14, into the lower portion of the conduit 15 where they are subjected to the action of the fluid current entering this latter conduit through its inlet 16 in order to complete the removal of all of the remaining very fine particles from the grains. The completely cleaned grains are finally discharged at the lower end of the conduit 15, under the control of the valve device 18.

The fluid current flowing upwardly through the conduit 3 and into the chamber 10 through the spaces between the blades 9, carries with it the fine and very fine particles that have been separated from the grain sized particles during the passage of the latter downwardly through the conduit 3. Due to the expansion that takes place in the chamber 10, the fine particles are separated from the fluid current and are collected in the hopper 11. The fluid current, with the very fine particles still suspended therein, passes out of the expansion chamber 10 into the conduit 5, which includes the expansion chamber 22. Due to the expansion that occurs in the chamber 22, any fine particles that may still remain in the current will settle out and will be collected in the hopper 23.

The fine particles that are collected in the hopper 11 are introduced, under the control of the valve 12 and through the passage 19, into the conduit 15 at a location that is substantially higher than the elevation at which the passage 20 delivers the partially dedusted grain sized particles to the conduit 15. Due to the difference in the locations or elevations of the points of connection of the passages 19 and 20 with the conduit 15, the fine particles that are delivered to the conduit by the passage 19 will be permitted to fall a substantial distance before they will encounter the grain sized particles that are delivered to the conduit 15 by the passage 20.

As the grain sized particles that fall downwardly through the portion of the conduit 15 located below the level of the passage 20 already have been freed of small sized particles to a very substantial extent, the fluid current that flows upwardly past the passage 20 will have suspended therein only a relatively small quantity of very fine particles. Consequently, this fluid current can very effectively act on the fine particles that are delivered to the conduit 15 by the passage 19 for separating out the very fine particles that still may be adhering to such fine particles. Because the falling fine particles that reach the level of the passage 20 have been very substantially freed of very fine particles, the passage of the fine particles downwardly through the lower end portion of the conduit 15 along with the substantially clean grain sized particles will effect a final cleaning of both the grain sized particles and the fine particles of all remaining very fine particles. The completely cleaned grain and fine particles then are discharged from the bottom of the conduit 15 through the valve device 18.

It will be appreciated from the above that the fluid current flowing upwardly through the low portion of the conduit 15 acts jointly on the grain sized particles, delivered by the passage 20, and the fine particles, delivered by the passage 19. Between the locations of the passages 19 and 20, the upwardly flowing fluid current is merely required to act on the descending fine particles. After passing the elevation of the passage 19, the fluid current in conduit 15 flows through the conduit 5, which includes the expansion chamber 22, to the cyclone separator 6. In passing through the expansion chamber 22, the fluid current will release any remaining fine particles which will fall into the hopper 23. Additionally, any fine particles which are present in the fluid current that flows into the conduit 5 from the expansion chamber 10 will be released in the expansion chamber 22 and will be delivered to the hopper 23. The fine particles that collect in the hopper 23 will be permitted to flow downwardly through the conduit 24, under the control of the valve 25, to the lower discharge end of the conduit 24.

When it is determined that the fine particles descending through the conduit 24 have some very fine particles mixed therewith, the flap valve 28 may be adjusted in the opening 27 to permit fluid current to flow into the conduit 24 from the conduit 15. This fluid flow upwardly through the conduit 24 will extract the very fine particles from the fine particles and will carry the very fine particles up to the conduit 5 and into the cyclone separator 6.

Due to the wide variations that may occur in the composition of the starting mixture of materials to be treated, an out-of-balance condition may develop between the fluid currents flowing through the two conduits 3 and 15. This out-of-balance condition may be corrected by changing the setting of the flap valve 21. Also, due to variations in the load that is imposed on the apparatus, or for other unavoidable reasons, the final refining of the grains in the conduit 15 may become ineffective. When this occurs, the auxiliary fan 29 may be operated to provide the required increase in the flow of fluid through the conduit 15.

In the modification of the invention illustrated in Fig. 2, the composition of the starting mixture of materials to be treated has been assumed to be such that the removal of the fine and very fine particles from the grain sized particles in the conduit 3, and the passage of these separated fine and very fine particles through the expansion chamber 10, may result in the separation of the fine particles in this chamber into categories of different sized particles. To take care of such a situation, the lower portion of the expansion chamber 10 is provided with the desired number of hoppers, such as 11a and 11b, in the illustrated example. A movable flap valve 11c is provided for controlling or regulating the particles sizes that are to be delivered to, or that are to be divided between, the two hoppers 11a and 11b.

The hoppers 11a and 11b are provided with passages 19a and 19b, respectively, through which the particles are discharged from the said hoppers into the conduit 15 at different levels. It will be appreciated that the larger sized fine particles will be deposited in the hopper 11a while the smaller sized fine particles, with a higher content of very fine particles will be deposited in the hopper 11b. Because the passage 19b communicates with the conduit 15 at a higher level than the passage 19a, the smaller sized fine particles that are deposited in the hopper 11b will be caused to fall a greater distance through the lower portion of the conduit 15 so as to effect complete separation of the very fine particles from the fine particles.

The modification of Fig. 2 also discloses the expansion chamber 22 as being of a construction which enables it to be adjustable. To this end, one of the walls of the chamber is rendered movable by being formed of several hingedly connected panels 22a, 22b and 22c. The outer edges of the panels 22a and 22c are intended to slide along the fixed wall 22d of the chamber 22 while the central panel 22b may be moved inwardly and outwardly by means of the operating screw 22e.

In other respects, the operation of the apparatus of Fig. 2 is the same as that of the apparatus of Fig. 1.

The apparatus of the modification illustrated in Fig. 3 differs from the apparatus illustrated in Fig. 1 only by the provision of means for controlling the rate at which the fine particles, collected in the hopper 11, are delivered to the conduit 15 in accordance with variations in the flow of fluid through the inlet 16 for the conduit 15. That is to say, when the flow of fluid through the inlet 16 increases, the quantity of fine particles introduced into the conduit 15 from the hopper 11 will increase, and vice versa.

It is quite obvious that the rate of flow of the gaseous fluid through the inlet 16 will bear a direct relationship to the amount of resistance the fluid current encounters in its passage through the conduit 15. Therefore, an increase in the rate of flow of fluid through the inlet 16 indicates that the fluid current which has passed the location of the passage 20 will be capable of efficiently cleaning a larger quantity of fine particles delivered from the hopper 11 than would be the case if the flow of fluid at 16 were decreased. By this means, the resistance of the conduit 15 as a whole and the flow of fluid therein are regulated with the result that the flow and the action of the fluid in the conduit 3 and chamber 10 are regulated. The measured or controlled distribution above referred to may be, for example, arranged as follows:

The hopper 11 is made of sufficient capacity to enable it to act as a regulating hopper. In the lower portion of the passage 19 there is arranged a device that is adapted for distributing the particles discharged from the hopper 11 in an opened or scattered condition, said device being adjustable to vary the cross-sectional area of the opening through which the particles are discharged. A set of spaced, sloping and tilted blades answer these requirements, and it is such a device that has been illustrated and is identified by the reference character 30. These blades are connected together for simultaneous pivotal movement and are controlled by means of a common operating member, such as the lever 31.

Mounted in the inlet 16 for the conduit 15 is a device, such as a Pitot tube 32, that is responsive to the pressure of the fluid flowing through the inlet. Operatively connected to the device 32 is a relay of any known type that is capable of converting into mechanical motions the variations in the fluid flow that are registered by the tube 32. Such a relay is diagrammatically illustrated at 33, and its actuated movement member takes the form of an oscillating lever 34 which will effect a downward movement when the flow increases in the inlet 16 and an upward movement when the flow decreases.

By means of the bell crank 35 and the connecting rods 36 and 37, the lever 34, when actuated by the relay 33, will effect the desired movements of the lever 31 and the pivoted blades 30 to which such lever is operatively connected.

Whenever there is an increase in the flow of fluid in the inlet 16, the lever 31 will be actuated to bring about an increase in the downward slope of the blades 30 so as to allow the discharge of a greater quantity of particles from the hopper 11. A decrease in the flow of fluid through the inlet 16 will result in a reduction in the inclination of the blades 30 and a corresponding reduction in the quantity of particles that are discharged from the hopper 11.

In the modification of Fig. 4 two levers 31a and 31b may be actuated simultaneously and in the same direction by the drive mechanism 36—37 to effect discharge into the conduit 15 of the categories of particles from the two hoppers 11a and 11b in a predetermined proportional relationship in accordance with the average percentage of these categories in the starting mixture of material to be treated. However, it may be preferable, as illustrated in Fig. 5, to have the blades 30a and 30b move in opposite directions or so that when the slope of the blades 30a is increased, for example, the slope of the blades 30b will be decreased, and vice versa.

The drive of Fig. 5 is so arranged that when the flow of fluid increases in the inlet 16, a comparatively greater quantity of the smaller sized fine particles and a comparatively smaller quantity of the larger sized fine particles are introduced into the conduit 15 from the hoppers 11a and 11b, while the reversed condition will take place when the value of said inlet flow decreases. To this end, the drive of Fig. 5 is provided with a reversing lever 38 for actuating the blades 30b.

In the modification of Fig. 6, there is effected a mechanical division of the starting mixture of materials that is obtained by means of the sieve 39, which may be fixed as illustrated or it may be vibrated by any suitable mechanism, not shown. Otherwise, the modification of Fig. 6 is generally similar to that of Fig. 3.

With this apparatus of Fig. 6, the grain sized particles will not be permitted to pass through the openings of the sieve 39. They, therefore, will be discharged from the lower end of the sieve into the conduit 3 where they will be subjected to a preliminary refining operation before being introduced into the intermediate portion of the conduit 15 by means of the passage 20.

The fine and very fine particles that pass through the openings of the sieve 39, together with the fluid current leaving the upper end of the conduit 3, are received in the expansion chamber 10a that is located beneath the sieve and above the hopper 11. In the chamber 10a, the expansion of the fluid current brings about a separation of the fine particles from the very fine particles. The fine particles are collected in the hopper 11 and the very fine particles are carried by the fluid current into the conduit 5 and through its expansion chamber 22 to the cyclone separator 6, such as illustrated in the preceding figures. The fine particles that are collected in the hopper 11 are controllably delivered to the passage 19 by means of the valve device 12 and these particles are discharged into the second fluid conduit 15 at a level above the discharge passage 20 for the partially cleaned grain sized particles.

I claim:

1. A dry process for dedusting coals and similar materials, comprising maintaining in a first vertically extending confined path an upwardly flowing gaseous fluid current, delivering to the upper portion of said first fluid path to pass downwardly lengthwise thereof the starting mixture of grain sized particles and fine and very fine small sized particles so that the fine and most of the very fine small sized particles will be separated from the falling grain sized particles by the first rising fluid current, maintaining in a second vertically extending confined path an upwardly flowing gaseous fluid current, delivering to an intermediate portion of said second fluid path to pass downwardly lengthwise of the remainder thereof the partially dedusted grain sized particles that reach the lower end portion of the said first fluid path so that the remaining very fine small sized particles will be separated from the falling grain sized particles by the second rising fluid current, partially expanding the fluid current leaving the upper portion of the first fluid path to separate therefrom most of the fine small sized particles suspended therein, delivering the thus separated fine small sized particles to an intermediate portion of said second fluid path to cause the fluid current rising therein to separate and carry upwardly any very fine small sized particles still remaining with said fine particles and to permit said fine particles to fall downwardly through the remainder of the second fluid path for discharge from the bottom thereof with the dedusted grain sized particles, delivering to the upper portion of the second fluid path the partially expanded fluid current from the first fluid path so that the two fluid currents will mix, partially expanding the mixed fluid currents leaving the upper portion of the second fluid path to separate therefrom the fine small sized particles suspended therein, and finally separating from the partially expanded, mixed fluid currents the small sized particles still suspended therein.

2. The process of claim 1 further characterized by subjecting the starting mixture to impact blows directly after its delivery to assist the fluid current in effecting separation of the said small sized particles from the grain sized particles.

3. The process of claim 1 further characterized by collecting the fine small sized particles that are separated by partially expanding the fluid current leaving the upper portion of the first fluid path, and delivering the said collected fine small sized particles at a controlled rate to the intermediate portion of said second fluid path.

4. The process of claim 3 further characterized by removing from the lower end of the second fluid path the dedusted grain sized particles and the fine small sized particles that have been freed of very fine small sized particles in the lower portion of the second fluid path.

5. The process of claim 4 further characterized by subjecting the starting mixture to impact blows directly after its delivery to assist the fluid current in effecting separation of the said small sized particles from the grain sized particles.

6. The process of claim 3 further characterized by subjecting the starting mixture to impact blows directly after its delivery to assist the fluid current in effecting separation of the said small sized particles from the grain sized particles.

7. The process of claim 3 further characterized by the rate of control of the delivery of fine small sized particles to the intermediate portion of the second fluid path being determined by the rate of the flow of fluid current through said second fluid path.

8. The process of claim 7 further characterized by delivering to a third fluid path the fine small sized particles that are separated from the mixed fluid currents by the said partial expansion thereof.

9. The process of claim 8 further characterized by subjecting the starting mixture to impact blows directly after its delivery to assist the fluid current in effecting separation of the said small sized particles from the grain sized particles.

10. The process of claim 1 further characterized by delivering to the upper end portion of a third fluid path the fine small sized particles that are separated from the mixed fluid currents by the said partial expansion thereof.

11. The process of claim 1 further characterized by collecting in categories of different sized particles the fine small sized particles that are separated by partial expansion of the fluid current leaving the upper portion of the first fluid path, and delivering the different sized particles at controlled rates to the intermediate portion of said second fluid path at different elevations above the location at which the partially dedusted grain sized particles are delivered to said path and with the smallest sized particles being delivered at the highest elevation to cause the fluid current rising in the second fluid path to separate and carry upwardly any very fine small sized particles still remaining with said different sized fine particles.

12. The process of claim 11 further characterized by delivering to a third fluid path the fine small sized particles that are separated from the mixed fluid currents by the said partial expansion thereof.

13. Apparatus for dedusting coals and similar materials, comprising a first substantially vertical conduit, means for delivering to the upper portion of said conduit to pass downwardly lengthwise thereof the starting mixture of grain sized particles and fine and very fine small sized particles, means for admitting fluid to the lower portion of said first conduit to create an upwardly flowing current therein which will separate the fine and most of the very fine small sized particles from the grain sized particles during the passage of the latter downwardly through said conduit, a second substantially vertical conduit, means for delivering to the intermediate portion of the second conduit to pass downwardly lengthwise of the remainder thereof the partially dedusted grain sized particles that reach the lower portion of the first conduit, means for admitting fluid to the lower portion of the second conduit to create an upwardly flowing current therein which will separate the remaining very fine small sized particles from the grain sized particles during the downward passage of the latter through the second conduit, an expansion chamber positioned between and communicating with the upper portions of said first and second conduits for separating fine small sized particles from the fluid current flowing therethrough from the first conduit to the second conduit, means for delivering to an intermediate portion of the second conduit the fine small sized particles separated from the current flowing through the aforesaid expansion chamber, a cyclone separator for removing small sized particles from the fluid flowing therethrough, a connection between the upper portion of the said second conduit and the cyclone separator, and means forming an expansion chamber in the said connection for separating fine small sized particles from the fluid current flowing to the cyclone separator.

14. The apparatus of claim 13 further characterized by the first substantially vertical conduit having a side discharge opening adjacent its upper end, and a series of vertically spaced and stepped baffle members arranged across said opening and in the path of the downwardly passing starting mixture to spread the particles thereof, the expansion chamber communicating with the upper portions of the first and second conduits being positioned between the series of baffles and the second conduit.

15. The apparatus of claim 14 further characterized by hopper means communicating with the expansion chamber between the upper portions of the first and second conduits for collecting the separated fine small sized particles, means for delivering the fine small sized particles collected in the hopper means at a controlled rate to an intermediate portion of the second conduit, and means for delivering to a third fluid current confining conduit the fine small sized particles that are separated from the fluid current flowing through the expansion chamber formed in the connection between the upper portion of the second conduit and the cyclone separator.

16. The apparatus of claim 15 further characterized by means for delivering to a third fluid current conduit the fine small sized particles that are separated from the fluid current flowing through the expansion chamber formed in the connection between the upper portion of the second conduit and the cyclone separator.

17. The apparatus of claim 13 further characterized by hopper means communicating with the expansion chamber between the upper portions of the first and second conduits for collecting the separated fine small sized particles, and means for delivering the fine small sized particles collected in the hopper means to an intermediate portion of the second conduit at a controlled rate.

18. The apparatus of claim 17 further characterized by means operating in response to changes in the rate of flow of the fluid through the second conduit for actuating the means that delivers to the intermediate portion of the second fluid conduit the fine small sized particles collected in the hopper means so as to regulate the rate of such delivery in accordance with such fluid flow.

19. The apparatus of claim 18 further characterized by means for delivering to the upper end portion of a third conduit the fine small sized particles that are separated from the fluid current flowing through the expansion chamber formed in the connection between the upper portion of the second conduit and the cyclone separator, and means for creating an upwardly flowing current in the upper portion of the third conduit.

20. The apparatus of claim 13 further characterized by means for delivering to the upper end portion of a third conduit the fine small sized particles that are separated from the fluid current flowing through the expansion chamber formed in the connection between the upper portion of the second conduit and the cyclone separator, and means for creating an upwardly flowing current in the upper portion of the third conduit.

21. The apparatus of claim 20 further characterized by hopper means communicating with the expansion chamber between the upper portions of the first and second conduits for collecting the separated fine small sized particles, and means for delivering the fine small sized particles collected in the hopper means to an intermediate portion of the second conduit at a controlled rate.

22. The apparatus of claim 13 further characterized by a pair of hoppers forming the lower portion of the expansion chamber between the upper portions of the first and second conduits for collecting the separated fine small sized particles in two categories of sizes, and means for delivering the different sized particles at controlled rates to the intermediate portion of said second fluid path at different elevations above the location at which the partially dedusted grain sized particles are delivered to said path and with the smaller sized particles being delivered at the highest elevation.

23. The apparatus of claim 13 further characterized by the first substantially vertical conduit having a side discharge opening adjacent its upper end, and a sieve bridging said discharge opening and arranged so that the starting mixture will travel over the sieve in passing downwardly through the upper portion of the conduit.

References Cited in the file of this patent

UNITED STATES PATENTS

| | | |
|---|---|---|
| 69,784 | Dewall | Oct. 15, 1867 |
| 845,870 | Hedfeldt | Mar. 5, 1907 |
| 1,109,299 | Morse | Sept. 1, 1914 |
| 1,787,759 | Patton et al. | Jan. 6, 1931 |
| 1,791,673 | Karlson | Feb. 10, 1931 |
| 1,850,756 | Lessing | Mar. 22, 1932 |
| 1,895,771 | Roalfe | Jan. 31, 1933 |
| 1,912,910 | Neuman | June 6, 1933 |
| 1,977,479 | Hebley | Oct. 16, 1934 |
| 2,000,181 | Lessing | May 7, 1935 |
| 2,386,975 | Pearce | Oct. 16, 1945 |

FOREIGN PATENTS

| | | |
|---|---|---|
| 358,329 | Great Britain | Oct. 8, 1931 |
| 413,294 | Great Britain | July 11, 1934 |
| 474,557 | Great Britain | Nov. 3, 1937 |

OTHER REFERENCES

Transactions of the Institute of Mining Engineers, vol. LXXXIX, part 6, pp. 298–334; published by A. Reid & Co. Ltd., Newcastle upon Tyne, England, 1935.